United States Patent Office 2,724,464
Patented Nov. 22, 1955

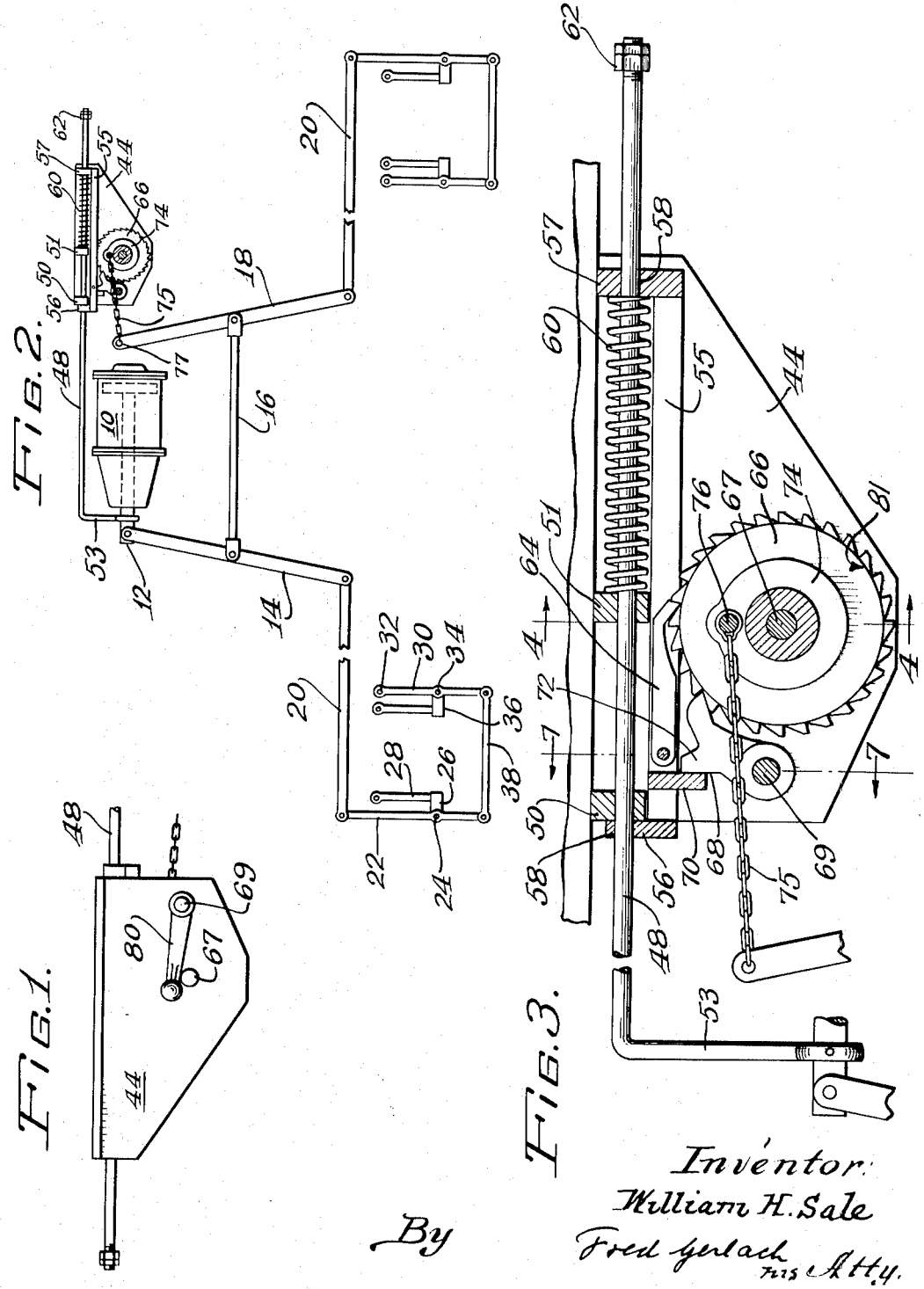

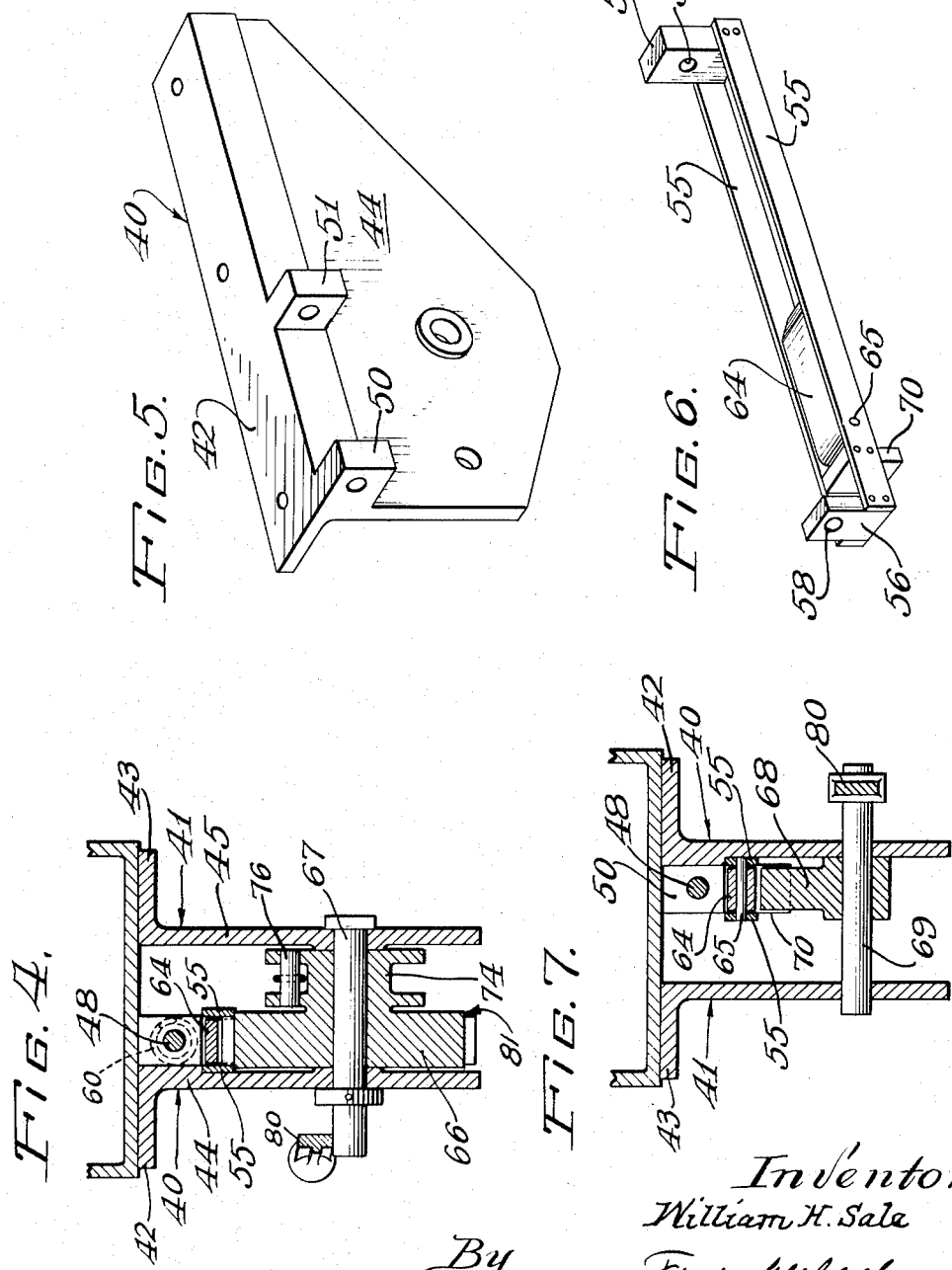

2,724,464

SLACK ADJUSTING DEVICE FOR RAILWAY BRAKES

William H. Sale, Richmond, Va., assignor of one-third to Louis W. Chandler, Joliet, and two-thirds to Paul Willis, Blue Island, Ill.

Application August 24, 1950, Serial No. 181,120

10 Claims. (Cl. 188—196)

The invention relates to slack adjusting devices for operating connections for railway car brakes.

One object of the invention is to provide a slack adjusting device for the operating connections for said brakes, which is simple in construction, efficient in operation and can be readily installed and serviced. Other objects will appear from the detailed description.

The invention consists in the several novel features hereinafter set forth and more particularly defined in claims at the conclusion hereof.

In the drawings:

Fig. 1 is a side elevation of a slack adjusting device embodying the invention;

Fig. 2 is a diagrammatic view illustrating an air brake system and the connections for operating the brakes with the slack adjusting device applied thereto;

Fig. 3 is a longitudinal section, parts being shown in elevation, of the slack adjusting device;

Fig. 4 is a section taken on line 4—4 of Fig. 3;

Fig. 5 is a perspective view of one section of the supporting bracket for the slack adjusting device;

Fig. 6 is a perspective view of the pawl carrier which is slidable relatively to the supporting bracket; and Fig. 7 is a section taken on line 7—7 of Fig. 3.

The invention is exemplified with brake operating connections which include an air cylinder 10 which is supported on the car and provided with a piston having a stem 12 which is connected to apply the brakes when air is admitted into one end of the cylinder, and is spring-retracted to shift the stem to release the brakes as well understood in the art. The outer end of stem 12 has pivotally connected thereto a lever 14 which is connected by a link 16 to a lever 18. Each of the levers 14 and 18 is adapted to operate the brake shifting elements for the brake shoes on one of the car trucks and is connected to a rod 20. Each rod 20 is connected to the usual lever system for operating the brakes on one of the trucks of a railway car. Each lever system is of standard construction and includes a lever 22 pivoted to a rod 20, and pivotally connected at 24 to a brake beam 26 which carries the brake shoes for one pair of truck wheels, a lever 30 fulcrumed at 32 on the truck frame and to which the brake beam 36 which carries the brake shoes for the other pair of wheels is piovtally connected at 34 and a link 38 which connects the lower ends of levers 22 and 30.

The slack adjusting device comprises a bracket which is adapted to be mounted on the car body, usually on the center sill and preferably includes a pair of sections 40 and 41, provided with top flanges 42 and 43 respectively which are adapted to be fixedly secured to the center sill of the car body. The bracket sections include integral depending flanges 44 and 45 which are spaced apart to provide a space between them for the slack adjusting device. A rod 48 is slidably mounted in and extends through lugs 50 and 51 which are integral with and project inwardly from the upper portion of bracket section 40. The rod 48 is provided at one of its ends with an integral arm 53 which is fixed to the projecting end of piston stem 12, and is shiftable by and with said stem and the piston in cylinder 10. A pawl carrier is longitudinally slidable on rod 48 and confines a pair of side bars 55 and end members 56 and 57 rigidly secured together. Rod 48 is slidable in holes 58 in the end members 56 and 57 of the pawl carrier. A coil spring 60 around rod 48 and between lug 51 and the end 57 of the carrier is adapted to retract the carrier in the direction in which the piston stem is retracted and normally holds end member 56 in abutting relation with lug 50 on bracket section 40. A nut 62 on one end of rod 48 is adapted to abut against end 57 and shift the carrier in one direction against the force of spring 60 when the slack in the brake operating connections causes an increase in the stroke of the piston cylinder 10 over the normal stroke desired for the operation of the brakes. The nut 62 is adjustable on rod 48 to vary the stroke of said rod before engagement of the nut by the carrier. A pawl 64 is pivoted at 65 between the bars 55 of and bodily movable with the carrier and is adapted to rotate in one direction a ratchet wheel 66 which is journalled on shaft 67 which is supported and extends through the depending flanges 44 and 45 of the sections 40 and 41 of the supporting bracket. A dog 68 is fixed to a cross shaft 69 which is journalled in depending flanges 44 and 45 and is adapted to lock ratchet wheel 66 against reverse rotation. An abutment 70 fixed between bars 55 of the carrier is adapted to engage an arm or lug 72 on dog 68 and lock it in engagement with ratchet wheel 66 while the carrier is in its normal position, and to release the dog to permit one-way rotation of the ratchet wheel 66 when the pawl carrier is retracted by spring 60, after said carrier has been shifted by nut 62. A drum 74 is fixed to rotate, or integral with ratchet wheel 66 and a chain 75 has one of its ends connected to an eccentric pin 76 on drum 74 and its other end connected at 77 to lever 18.

The operation will be as follows:

When there is normal slack in the operating connections, the outstroke of piston 12 will impart a predetermined movement to the brake operating connections for applying the brakes. Rod 48 will move a distance corresponding to the stroke of stem 12 and nut 62 will move to end member 57 of the carrier without shifting the carrier against the force of spring 60. During this operation, the dog 68 will lock the ratchet wheel 66 against rotation in either direction and lever 18 will fulcrum on the end of chain 75 and be shifted from lever 14 to rod 20. Lever 14 will be shifted by the piston stem 12. When the brake shoes become worn, the gaps between the brake shoes are increased or when the brake operating connections become loose the slack is increased, a longer stroke of the piston stem will occur before the piston stem is arrested by the brake operating connections. When the piston stroke is thus increased, nut 62 will strike end member 57 of the carrier and shift it against the force of spring 60 a distance corresponding to said increase during the outstroke of the piston.

During this increased shift, dog 68 will prevent retractive rotation of ratchet wheel 66, but abutment 70 will move away from arm 72 and release the dog to permit opposite rotation of wheel 66, and pawl 64 will slip over the teeth on said wheel until the piston in cylinder reaches the end of its outstroke. When the brakes are released by the retraction of piston stem 12, spring 60 will retract the pawl carrier and pawl 64 will engage the teeth of ratchet wheel 66 and rotate said wheel proportionately to the increase in the outstroke of stem 12. This rotation of the ratchet wheel will rotate drum 74 to wind chain 75 thereon and shift through lever 18 the operating connections to take up the slack the desired extent. This occurs automatically whenever the slack permits sufficient increase in the stroke of the piston to cause the carrier to be shifted a sufficient distance to move the pawl 64 for rotating the ratchet wheel at least one step. By adjusting the nut 62 on rod 48, the predetermined distance which the rod 62 moves before the carrier is shifted, may be varied.

When the pawl carrier is in its normal position, the abutment 70 locks dog 68 to prevent retraction of ratchet wheel 66 by the guide lug 51 so that the dog and pawl cannot be displaced. During the initiation of the movement of the carrier against the force of spring 60, dog 68 will be released by abutment 70 and pawl 64 will pass away from lug 51 to permit the pawl 64 to rise and slip over the teeth of ratchet 66.

When replacing old or installing new brake shoes, it is desirable to reset the ratchet wheel 66. For this purpose, it is necessary to release the dog 68 and pawl 64. An arm 80 is fixed to cross shaft 69 to which dog 68 is fixed and extends over shaft 67. To release the ratchet wheel 66 for resetting, a pry may be used between shaft 67 and the free end of arm 80 for rocking said arm, shaft 69 and dog 68 a sufficient distance to cause arm 72 on said dog to shift abutment 70 and the pawl carrier against the force of spring 60, to disengage dog 68 from ratchet wheel 66 and to permit pawl 64 to be lifted away from said ratchet wheel. When the ratchet wheel 66 is thus released it can be rotated in either direction while being reset. The ratchet wheel 66 may be provided with annular shoulders 81 on which the side bars 55 of the pawl carrier can ride.

The invention exemplifies a slack adjusting or compensating device for railway brake connections which is simple in construction, efficient in operation and can be readily installed, and produced at a low cost.

The invention is not to be understood as limited to the details described, since these may be modified within the scope of the appended claims without departing from the spirit and scope of the invention.

Having thus described the invention, what I claim as new and desire to secure by Letters Patent is:

1. A slack adjusting device for brake-operating connections on a railway car which is equipped with an air cylinder, a piston operative in the cylinder, and a stem on the piston for operating said connections, comprising: a bracket supported on the car, a rod slidably mounted in the bracket and operatively connected to the piston-stem, a carrier slidably supported on said rod, an abutment on the rod engaging the carrier for shifting it in one direction when there is an increase in the piston stroke, a spring between the bracket and the carrier for retracting the carrier, a ratchet wheel mounted on the bracket, a pawl pivotally mounted on the carrier and engaging the ratchet wheel for rotation during the retraction of the carrier, a dog pivotally mounted on the bracket and engaging the ratchet wheel for holding it against retraction, and means operable by the ratchet wheel and connected to the brake operating connections for taking up the slack in said operating connections.

2. A slack adjusting device for brake-operating connections on a railway car which is equipped with an air cylinder, a piston operative in the cylinder, and a stem on the piston for operating said connections, comprising: a bracket supported on the car, a rod slidably mounted in the bracket and operatively connected to the piston-stem, a carrier slidably supported on said rod, an abutment on the rod engaging the carrier for shifting it in one direction when there is an increase in the piston stroke, a spring between the bracket and the carrier for retracting the carrier, a ratchet wheel mounted on the bracket, a pawl pivotally mounted on the carrier and engaging the ratchet wheel for rotation during the retraction of the carrier, a dog pivotally mounted on the bracket and engaging the ratchet wheel for holding it against retraction, a winding drum connected to rotate with the ratchet wheel, and a flexible connector between the drum and the brake-operating connections for taking up the slack in said connections.

3. A slack adjusting device for brake-operating connections, including a pair of levers and a link between said levers, on a railway car equipped with an air cylinder, a piston operative in the cylinder, and a stem on the piston connected to one of said levers, comprising: a bracket supported on the car, a rod slidably mounted in the bracket and operatively connected to the piston-stem, a carrier slidably supported on said rod, an abutment on the rod engaging the carrier for shifting it in one direction when there is an increase in the piston stroke, a spring between the bracket and the carrier for retracting the carrier, a ratchet wheel mounted on the bracket, a pawl pivotally mounted on the carrier and engaging the ratchet wheel for rotation during the retraction of the carrier, a dog pivotally mounted on the bracket and for engaging the ratchet wheel for holding it against retraction, an element secured to rotate with the ratchet wheel, and a connection between said element and the other lever for taking up the slack in the operating connections.

4. A slack adjusting device for brake-operating connections, including a pair of levers and a link between said levers, on a railway car equipped with an air cylinder, a piston operative in the cylinder, and a stem on the piston connected to one of said levers, comprising: a bracket supported on the car, a rod slidably mounted in the bracket and operatively connected to the piston-stem, a carrier slidably supported on said rod, an abutment on the rod engaging the carrier for shifting it in one direction when there is an increase in the piston stroke, a spring between the bracket and the carrier for retracting the carrier, a ratchet wheel mounted on the bracket, a pawl pivotally mounted on the carrier and engaging the ratchet wheel for rotation during the retraction of the carrier, a dog pivotally mounted on the bracket and for engaging the ratchet wheel for holding it against retraction, a flexible element secured to rotate with the ratchet wheel, and a connection between said element and the other lever for taking up the slack in the operating connections.

5. A slack adjusting device for brake-operating connections on a railway car equipped with an air cylinder, a piston operative in the cylinder, and a stem on the piston, comprising: a bracket supported on the car, a rod slidably mounted in the bracket and operatively connected to the piston-stem, a carrier slidably supported on said rod, an abutment on the rod engaging the carrier for shifting it in one direction when there is an increase in the piston stroke, a spring between the bracket and the carrier for retracting the carrier, a ratchet wheel mounted on the bracket, a pawl pivotally mounted on the carrier and engaging the ratchet wheel for rotation during the retraction of the carrier, a dog pivotally mounted on the bracket engaging the ratchet wheel for holding it against retraction, means on the carrier for locking the dog on the ratchet wheel when the carrier is in its normal position, and means operatively connected to the ratchet wheel and the brake-operating connections for taking up the slack in said operating connections.

6. A slack adjusting device for brake-operating connections on a railway car equipped with an air cylinder, a piston operative in the cylinder, and a stem on the piston, comprising: a bracket supported on the car, a rod slidably mounted in the bracket and operatively connected to the piston-stem, a carrier slidably supported on said rod, an abutment on the rod engaging the carrier for shifting it in one direction when there is an increase in the piston stroke, a spring between the bracket and the carrier for retracting the carrier, a ratchet wheel mounted on the bracket, a pawl pivotally mounted on the carrier and engaging the ratchet wheel for rotation during the retraction of the carrier, a dog pivotally mounted on the bracket engaging the ratchet wheel for holding it against retraction, an abutment on the carrier for locking the dog and preventing rotation of the ratchet wheel when the carrier is in its normal position, and means operatively connected to and operable by the ratchet wheel for taking up the slack in the brake-operating connections.

7. A slack adjusting device for brake-operating connections on a railway car equipped with an air cylinder, a piston operative in the cylinder and a stem on the piston for operating said connections, comprising: a bracket supported on the car and provided with a pair of lugs, a rod slidably mounted in said lugs and operatively connected to the piston-stem, a carrier slidably supported on said rod, including end members through which said rod is slidable and side members, one of which end members is adapted to abut against one of said lugs, an abutment on the rod positioned to engage one of the end members of the carrier for shifting it in one direction when there is an increase in the piston stroke, a spring between the bracket and the carrier for retracting the carrier, a ratchet wheel mounted on the bracket, a pawl pivotally mounted on the carrier and operatively engaging the ratchet for its rotation during the retraction of the carrier.

8. A slack adjusting device for brake-operating connections on a railway car equipped with an air cylinder, a piston operative in the cylinder and a stem on the piston for operating said connections, comprising: a bracket supported on the car and provided with a pair of lugs, a rod slidably mounted in said lugs and operatively connected to the piston-stem, a carrier slidably supported on said rod, including end members through which said rod is slidable and side members, one of which end members is adapted to abut against one of said lugs, an abutment on the rod, positioned to engage one of the end members of the carrier for shifting it in one direction when there is an increase in the piston stroke, a spring around said rod and between the bracket and the carrier for retracting the carrier, a ratchet wheel mounted on the bracket, a pawl pivotally mounted on the carrier and operatively engaging the ratchet for its rotation during the retraction of the carrier.

9. A slack adjusting device for brake-operating connections on a railyay car equipped with an air cylinder, a piston operative in the cylinder, and a stem on the piston, comprising: a bracket supported on the car, a rod slidably mounted in the bracket and operatively connected to the piston-stem, a carrier slidably supported on said rod, an abutment on the rod engaging the carrier for shifting it in one direction when there is an increase in the piston stroke, a spring between the bracket and the carrier for retracting the carrier, a ratchet wheel mounted on the bracket, a pawl pivotally mounted on the carrier and engaging the ratchet wheel for rotation during the retraction of the carrier, means on the bracket engaging and holding the pawl engaged with the ratchet wheel when the carrier is in its normal position, a dog pivotally mounted on the bracket and engaging the ratchet wheel for holding it against retraction, and means operable by the ratchet wheel and connected to the brake-operating connections for taking up the slack in said operating connections.

10. A slack adjusting device for brake-operating connections on a railway car equipped with an air cylinder, a piston operative in the cylinder, and a stem on the piston, comprising: a bracket supported on the car, a rod slidably mounted in the bracket and operatively connected to the piston-stem, a carrier slidably supported on said rod, an abutment on the rod engaging the carrier for shifting it in one direction when there is an increase in the piston stroke, a spring between the bracket and the carrier for retracting the carrier, a ratchet wheel mounted on the bracket provided with a rim engaged by the carrier, a pawl pivotally mounted on the carrier and engaging the ratchet wheel for rotation during the retraction of the carrier, a dog pivotally mounted on the bracket and engaging the ratchet wheel for holding it against retraction, and means operable by the ratchet wheel and connected to the brake-operating connections for taking up the slack in said operating connections.

References Cited in the file of this patent
UNITED STATES PATENTS

| | | |
|---|---|---|
| 1,144,453 | Wood et al. | June 29, 1915 |
| 1,770,037 | Kadel et al. | July 8, 1930 |
| 1,862,136 | Camp | June 7, 1932 |
| 2,562,226 | Wilson | July 31, 1951 |